United States Patent [19]

Fujii et al.

[11] Patent Number: 4,502,819
[45] Date of Patent: Mar. 5, 1985

[54] CONSTANT DISCHARGE DEVICE IN A CONVEYOR FOR POWDERY AND GRANULAR MATERIALS

[75] Inventors: Shuzo Fujii; Koichi Abe; Hideo Miwa, all of Tokyo, Japan

[73] Assignee: Denka Engineering Kabushiki Kaisha, Tokyo, Japan

[21] Appl. No.: 388,304

[22] Filed: Jun. 14, 1982

[51] Int. Cl.³ .................... B65G 53/40; B65G 53/66
[52] U.S. Cl. .................... 406/14; 406/30; 406/93; 406/132; 406/136; 406/142
[58] Field of Search .................... 406/14, 93, 132, 133, 406/141, 142, 28–30, 94, 95; 406/12, 19, 127, 128, 134, 136, 137, 138, 34, 143

[56] References Cited

U.S. PATENT DOCUMENTS 1,319,193 10/1919 Von Porat .................... 406/142 X
2,623,793 12/1952 Hill .................... 406/14

FOREIGN PATENT DOCUMENTS 163233 6/1955 Australia .................... 406/141
1283147 11/1968 Fed. Rep. of Germany ...... 406/142
313761 12/1971 U.S.S.R. .................... 406/143

*Primary Examiner*—Jeffrey V. Nase
*Assistant Examiner*—Daniel R. Edelbrock
*Attorney, Agent, or Firm*—Sughrue, Mion, Zinn, Macpeak & Seas

[57] ABSTRACT

A constant discharge device for a pneumatic conveyor for powdery or granular materials includes a discharge regulator valve disposed in a pressure tank that stores the powdery or granular material and movable toward or away from a discharge nozzle which has an open end through which the material is discharged out of the pressure tank into a conveyor pipe. The discharge regulator valve has an air outlet for ejecting a stream of air toward the discharge nozzle. The amount of the material as discharged into the conveyor pipe can be controlled by adjusting the position of the discharge regulator valve with respect to the discharge nozzle, and also by adjusting the rate of flow of air through the outlet of the discharge regulator valve.

4 Claims, 3 Drawing Figures

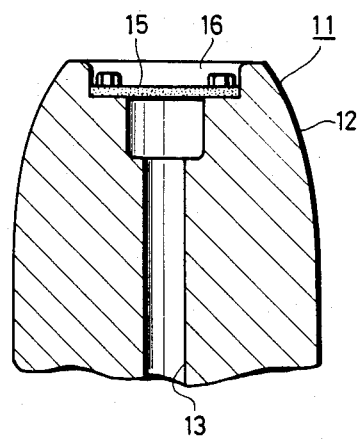

CONSTANT DISCHARGE DEVICE IN A CONVEYOR FOR POWDERY AND GRANULAR MATERIALS

BACKGROUND OF THE INVENTION

The present invention relates to a pneumatic conveyor for powdery and granular materials, and more particularly to a constant discharge device in such a conveyor having a discharge nozzle in a pressure tank.

Pressure tanks for pneumatic conveyors generally include a fluidizing system disposed adjacent to a discharge nozzle for fluidizing a powdery or granular material in the pressure tank. Constant discharge of the material in its fluidized state from the pressure tank is controlled by a loss-in-weight feeder system in which the rate of flow of conveying air is controlled to keep constant the rate of change of the measured weight of the tank with respect to time, or by a constant flow control system in which the rate of flow of conveying air is controlled on the basis of the weight and rate of flow of the material which is being conveyed through a discharge pipe. The prior constant discharge systems are however disadvantageous in that the material being conveyed is not fluidized sufficiently stably, and hence the rate of flow of the material as fed into the discharge pipe is not kept constant, resulting in a failure to achieve precise constant flow control.

SUMMARY OF THE INVENTION

It is an object of the present invention to provide a device for discharging a constant amount of powdery or granular material from a pressure tank having a fluidizing apparatus and a discharge nozzle located adjacent to the fluidizing apparatus.

According to the present invention, a constant discharge device includes a regulator valve movable toward or away from a discharge nozzle and having at its distal end an air outlet for ejecting a stream of air at all times. The amount of a powdery or granular material as it is introduced into the discharge nozzle or discharged out of a pressure tank is adjustably controlled by the pressure or linear velocity of fluidizing air and the area of the opening at the nozzle end, that is, the distance between the nozzle end and the regulator valve and the velocity of air as it is ejected from the air outlet in the regulator valve.

The above and other objects, features and advantages of the present invention will become more apparent from the following description when taken in conjunction with the accompanying drawings in which a certain preferred embodiment of the present invention is shown by way of illustrative example.

BRIEF DESCRIPTION OF THE DRAWINGS

FIG. 3 is an enlarged fragmentary cross-sectional view of a regulator valve in the constant discharge device shown in FIG. 2.

DESCRIPTION OF THE PREFERRED EMBODIMENT

Figure 1:
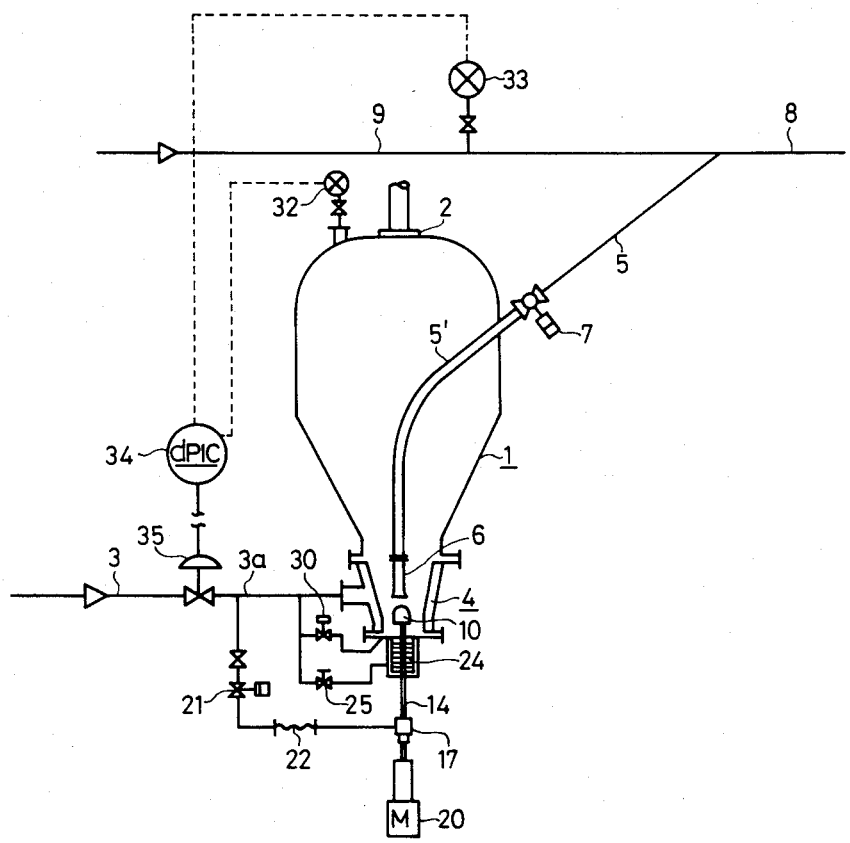
FIG. 1 is a schematic view of a pneumatic conveyor system in which a constant discharge device of the present invention is incorporated.

As shown in FIG. 1, a pressure tank 1 for storing a powdery or granular material therein has an upper inlet 2 for introducing the material into the tank 1. The pressure tank 1 also has in its lower end an apparatus 4 for fluidizing the powdery or granular material, the apparatus 4 extending along an inner peripheral wall of the pressure tank 1. A supply pipe 3 is connected to the fluidizing apparatus 4 for supplying air under pressure to the apparatus 4.

A pipe 5 for discharging the material is coupled to the pressure tank 1 and has a portion 5' extending through a wall of the tank 1 toward a position at the center of the fluidizing apparatus 4. The pipe portion 5' has on its distal end a discharge nozzle 6 surrounded by the fluidizing apparatus 4. The discharge pipe 5 has a discharge adjustment valve 7. The discharge pipe 5 is coupled to a booster air supply pipe 9, and the pipes 5 and 9 are joined to a conveyor pipe 8.

Figure 2:
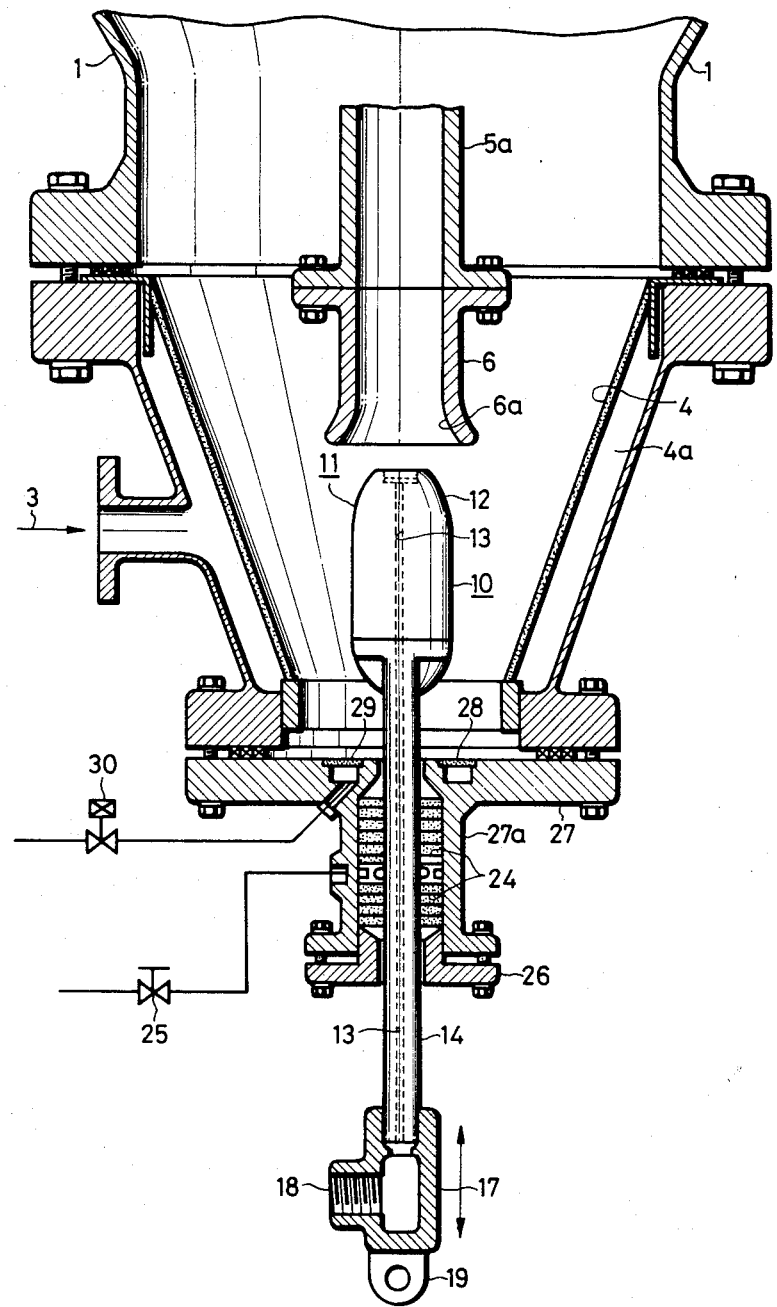
FIG. 2 is an enlarged fragmentary cross-sectional view of the constant discharge device of the invention.

A discharge regulator valve 10 is disposed in the pressure tank 1 in coaxial relation to the discharge nozzle 6. The valve 10 includes a substantially cylindrical valve body 11, as shown in FIG. 2, having a conical or hemispherical end 12 positioned in confronting relation to the discharge nozzle 6. The valve 10 is positionally adjustable so that the end 12 of the valve body 11 can be brought into or out of intimate contact with a lower inner peripheral surface 6a of the nozzle 6. The valve 10 includes a valve rod 14 coupled to and extending downwardly from the valve body 11. The valve rod 14 has a lower portion projecting out of the pressure tank 1 through a bottom plate 27 thereof.

The valve body 11 and the valve rod 14 have a central axial air passage 13 which is supplied with air under pressure from a hollow joint 17 coupled to the projecting end of the valve rod 14. The hollow joint 17 has a fitting 18 to which is supplied air under pressure via a control valve, as shown in FIG. 1, 21 and a flexible tube 22 from the air supply pipe 3. The hollow joint 17 is connected by a connector 19 to a linear driver 20 such as an electric actuator or a fluid cylinder for axially moving the valve rod 14 upwardly or downwardly.

The upper end 12 of the valve body 11 has a stepped opening 16 communicating with the air passage 13. A permeable porous plate 15 is fastened to the step in the opening 16, as shown in FIG. 3.

As shown in FIG. 2, the bottom plate 27 has a central sleeve 27a through which extends the valve rod 14 which is sealed by a seam member 24 disposed within the sleeve 27a surrounding the valve rod 14. The seal member 24 is retained in the sleeve 27a by a seal retainer 26 fixed to a lower end of the sleeve 27a. Air under pressure is supplied through a regulator valve 25 into the sleeve 27a in which the air is distributed circumferentially around the valve rod 14 to render the latter airtight and prevent entry of the powdery or granular material into the seal member 24.

The bottom plate 27 has in its upper surface an annular aerator chamber 28 extending concentrically around the valve rod 14 and having an annular permeable porous plate 29 through which air under pressure supplied via a regulator valve 30 is fed into the pressure tank 1.

As illustrated in FIG. 1, a pressure sensor 33 is coupled to the booster pipe 9 to detect the pressure in the booster pipe 9, and another pressure sensor 32 is connected to the pressure tank 1 to detect the pressure in the tank 1. The pressure sensors 33, 32 produce output signals which are delivered to a differential pressure regulator 34 that controls a pressure regulator valve 35 for adjusting the pressure of air flowing through the pipe 3. A signal indicative of the difference between the pressures detected by the pressure sensors 33, 32 is proportional to the amount of the material discharged into the discharge pipe 5, and hence serves to detect such discharged amount of the material indirectly.

As shown in FIG. 1, all supplies of air into the pressure tank 1 through the fluidizing apparatus 4, the annular aerator 29, the seal member 24, and the discharge regulator valve 10 are supplied under the control of the pressure regulator 35.

The air supply pipe 3 and the air booster pipe 9 may be connected to either a common supply of air under pressure or different supplies of air under pressure.

The constant discharge device thus constructed will operate as follows: Before the powdery or granular material starts being conveyed, the valve body 11 of the discharge regulator valve 10 is in close contact with the inner surface 6a of the discharge nozzle 6, the powdery or granular material is filled in the pressure tank 1, and the discharge valve 7 and the valves 21, 25, 30 are all closed.

For discharging the material out of the pressure tank 1 at a constant rate, air under pressure is supplied to the fluidizing apparatus 4 to fluidize the material and the pressure in the pressure tank 1 is increased to a predetermined degree. Then, booster air is supplied into the air booster pipe 9, the valves 21, 25, 30 are opened, and the driver 20 is actuated to lower the discharge regulator valve 10 out of engagement with the discharge valve 6. The material in the fluidized state is now caused to be discharged through the nozzle 6 into the discharge pipe 5 and then into the conveyor pipe 8.

The amount of the material as discharged varies with the axial distance between the nozzle 6 and the regulator valve 10, and the rate of flow of air from the valve body 11 through the porous plate 15. Thus, the powdery or granular material can be discharged out of the tank 1 at a desired constant rate or gas-solid ratio by adjusting the position of the valve body 11 with respect to the nozzle 6 through operation of the driver 20, and also by adjusting the rate of flow of air through the porous plate 15 through adjustment of opening of the valve 21.

For smooth introduction of and fine adjustment in the discharged amount of the powdery or granular material, the nozzle end surface 6a is preferably flared and the regulator valve end 12 is preferably streamlined for closer controlling intertion therebetween. The nozzle end surface 6a and the regulator valve end 12 may be differently shaped dependent on the powdery or granular material stored in the pressure tank 1.

Although a certain preferred embodiment of the present invention has been shown and described in detail, it should be understood that various changes and modifications may be made therein without departing from the scope of the appended claims.

What is claimed is:

1. A constant discharge device in a pneumatic conveyor for discharging a powdery or granular material, comprising:

a pressure tank for storing the powdery or granular material, said pressure tank having a fluidizing apparatus for fluidizing the material;

a conveyor pipe penetrating said tank;

a discharge nozzle disposed in said pressure tank adjacent to said fluidizing apparatus and adapted to be connected to the conveyor pipe, said discharge nozzle having an open end;

a discharge regulator valve disposed in said pressure tank in confronting relation to said open end of said discharge nozzle and having an outlet in an end thereof facing said discharge nozzle for ejecting a stream of air therethrough;

a driver for adjusting said discharge regulator valve positionally with respect to said open end of said discharge nozzle, whereby the amount of the material as discharged through said discharge nozzle into the conveyor pipe can be controllably adjusted by adjusting the position of said discharge regulator valve with respect to said open end of said discharge nozzle and also by adjusting the amount of the stream of air ejected through said outlet in said discharge regulator valve;

a booster pipe coupled to said conveyor pipe;

a first pressure sensor for detecting the pressure in said booster pipe;

a second pressure sensor for detecting the pressure in said pressure tank; and a differential pressure regulator controlled by signals supplied from said first and second pressure sensors, said fluidizing apparatus and said discharge regulator valve being supplied with air under pressure, the rate of flow of which is controlled by said differential pressure regulator.

2. A constant discharge device according to claim 1, wherein said open end of said discharge nozzle is flared, and said end of said discharge regulator valve is conical or hemispherical in shape.

3. A constant discharge device according to claim 1, wherein said pressure tank has a bottom plate, said discharge regulator valve including a valve body located in said pressure tank and a valve rod supporting on an end thereof said valve body and extending through said bottom plate of said pressure tank, said discharge regulator valve including an air passage extending through said valve body and valve rod for supplying said stream of air to said outlet.

4. A constant discharge device according to claim 1 or 2, wherein said pressure tank has a bottom plate and a peripheral wall extending around said discharge nozzle, said fluidizing apparatus being mounted on said bottom plate and said peripheral wall.

* * * * *

UNITED STATES PATENT AND TRADEMARK OFFICE
CERTIFICATE OF CORRECTION

PATENT NO. : 4,502,819

DATED : March 5, 1985

INVENTOR(S) : Shuzo Fujii et al.

It is certified that error appears in the above-identified patent and that said Letters Patent is hereby corrected as shown below:

Page 1, column 1, on line following line beginning "[22] Filed: June 14, 1982" insert --[30] Foreign Application Priority Data June 19, 1981 [JP] Japan 90704/81--.

Signed and Sealed this

Twelfth Day of November 1985

[SEAL]

Attest:

DONALD J. QUIGG

Attesting Officer

Commissioner of Patents and Trademarks